United States Patent
Kozu et al.

(10) Patent No.: US 7,426,881 B2
(45) Date of Patent: Sep. 23, 2008

(54) OPERATING POSITION SELECT DEVICE FOR AUTOMATIC TRANSMISSION

(75) Inventors: Tadao Kozu, Tokyo (JP); Masaharu Nagano, Tokyo (JP); Yukitsugu Hirota, Tokyo (JP); Mitsuo Kikkawa, Atsugi (JP); Yuichi Tanii, Atsugi (JP); Hiroyuki Ikari, Sagamihara (JP); Takehiro Kuroda, Atsugi (JP)

(73) Assignee: Calsonic Kansei Corporation, Tokyo (JP)

( * ) Notice: Subject to any disclaimer, the term of this patent is extended or adjusted under 35 U.S.C. 154(b) by 872 days.

(21) Appl. No.: 10/974,981

(22) Filed: Oct. 28, 2004

(65) Prior Publication Data

US 2005/0160849 A1 Jul. 28, 2005

(30) Foreign Application Priority Data

Oct. 29, 2003 (JP) ............................. 2003-369416

(51) Int. Cl.
*F16H 59/08* (2006.01)

(52) U.S. Cl. ................... 74/473.12; 74/473.15

(58) Field of Classification Search .................. 701/34, 701/53; 74/473.12, 473.15
See application file for complete search history.

(56) References Cited

U.S. PATENT DOCUMENTS 5,540,114 A 7/1996 Kim
5,598,740 A 2/1997 Itoh
7,313,980 B2 * 1/2008 Otsuka et al. ................. 74/335
2006/0011003 A1 * 1/2006 Osamura et al. ............. 74/335

FOREIGN PATENT DOCUMENTS

| EP | 0 368 322 B1 | 5/1990 |
| EP | 1 156 237 B1 | 11/2001 |
| EP | 1 437 533 A1 | 7/2004 |
| JP | 9-323559 A | 12/1997 |
| JP | 2003-97694 A | 4/2003 |

OTHER PUBLICATIONS

U.S. Appl. No. 10/974,975, filed Oct. 28, 2004, Shimamura et al.

* cited by examiner

*Primary Examiner*—Richard W L Ridley
*Assistant Examiner*—Terence Boes
(74) *Attorney, Agent, or Firm*—Foley & Lardner LLP

(57) ABSTRACT

An operating position select device has a select lever unit, a mode shift unit to shift operation modes of the automatic transmission, a mechanically connecting means connecting them, and an assist actuator to assist a select lever. A control unit that controls the actuator is electrically connected to an operating position sensor detecting an operating position of the select lever and an operating force sensor detecting operating force acting on the lever. The control unit has an improper halt detecting part detecting the improper halt of the lever between the select positions and an improper halt preventing part preventing the lever from being kept halted improperly between the select positions to provide the lever with adjustment force so that the lever moves to one of the select positions when the improper halt of the select lever is detected during select operation.

32 Claims, 16 Drawing Sheets

OPERATING POSITION SELECT DEVICE FOR AUTOMATIC TRANSMISSION

BACKGROUND OF THE INVENTION

1. Field of the Invention

The present invention relates to an operating position select device for an automatic transmission by which a driver can select by operating a select lever one of select mode positions corresponding to a plurality of operation modes of the automatic transmission.

2. Description of the Related Art

An operating position select device for an automatic transmission of this kind is disclosed in Japanese patent laying-open publication (Tokkaihei) No. 9-323559. This select device includes a select lever unit disposed near a driver's seat in a passenger compartment and a mode shift unit mounted on an automatic transmission. The select lever unit has a select lever manually operated by a driver and is connected with the mode shift unit by a connecting mechanism, such as a control cable, or a connecting linkage, which transmits an operating force applied on the select lever by the driver to the mode shift unit to shift operation modes of the automatic transmission.

The conventional art, however, has a problem that the select lever unit needs a long select lever in order to operate it without a large operating force of the driver, which reduces design freedom concerning an installation location of the select lever unit and/or a layout of a passenger compartment.

This reason comes from the fact that a length of the select lever is determined so that a driver can easily operate the select lever and its operating torque must overcome frictional resistance of the connecting mechanism and the like. Namely, the operating torque, generated by the operating force on the select lever, has to be larger than torque caused by the sum of the frictional resistance in the connecting mechanism and resistance generated when a detent pin, which moves with the select lever, gets over a cam top portion of a detent plate during select operation, although the operating force of the driver is limited to a certain extent. Accordingly, to satisfy both of the above requirements the select lever needs to be longer than a certain length, typically to be 350 mm.

Another operating position select device for an automatic transmission of this kind is disclosed in Japanese patent laying-open publication (Tokkai) No. 2003-97694. This select device is, what is called, a shift-by-wire type one. It has a select lever manually operated by a driver, a select position detector for detecting a position of the select lever, a mode shift unit mounted on an automatic transmission for shifting its operation modes, an electric motor for driving a mode shift unit, and a control unit for controlling the electric motor based on an output signal from the detector.

This select device is suitable for shortening a length of the select lever and expanding design freedom for its installation location and/or layout of a passenger compartment, while the select device lacks a mechanical connection between the select lever and the mode shift unit. This lack of the mechanical connection results in a problem that the mode shift unit can not be sifted despite of operating the select lever in case of electrical failure such that an electric wire is broken, or the select position detector or the control unit fails.

It is, therefore, an object of the present invention to provide an operating position select device for an automatic transmission which overcomes the foregoing drawbacks and can expand design freedom concerning layout of a passenger compartment and/or an installation location of a select lever unit, and drive a mode shift unit despite of electric failure of the operating position select device, and prevent the select lever 2 from being kept halted improperly between select positions.

SUMMARY OF THE INVENTION

According to the first aspect of the present invention there is provided an operating position select device for an automatic transmission whose operation modes are shiftable, the operating position select device comprising: a select lever unit having a select lever that is operated by a driver between a plurality of select positions corresponding to the operation modes; an operating position sensor that detects an operating position of the select lever and outputs an operating position signal; a mode shift unit mounted on the automatic transmission to shift operation modes of the automatic transmission; a mechanically connecting means that mechanically connects the select lever and the mode shift unit with each other; an assist actuator that is arranged between the select lever and the mode shift unit and supplies assist force to the shift lever; an operating force sensor that detects operating force acting on the select lever; and a control unit that controls the assist actuator based on at least the operating position signal, the control unit having an improper halt detecting part that detects the improper halt of the select lever between the select positions and an improper halt preventing part that prevents the select lever from being kept halted improperly between the select positions and provides the select lever with adjustment force so that the select lever moves to one of the select positions when the improper halt of the select lever is detected during select operation.

Preferably, the improper halt preventing part outputs an improper halt prevention signal so that the assist actuator moves said select lever to the one of the select positions when the improper halt preventing part receives an improper halt signal from the improper halt detecting part.

Preferably, the adjustment force acts on the select lever to move to the one of the select positions that is nearer to a position where the improper halt of the select lever is detected by the improper halt detecting part.

Preferably, the adjustment force acts on the select lever to move in the same direction as an operating direction of the select operation.

Preferably, the adjustment force acting on the select lever changes adjustment directions according to a position where the improper halt of the select lever is detected by the improper halt detecting part.

Preferably, the improper halt preventing part has a current table with data on an adjustment current to determine the adjustment force and the adjustment direction with respect to the operating position of the select lever.

Preferably, the improper halt detecting part detects the improper halt based on an operating velocity of the select lever to output an improper halt signal.

Preferably, the improper halt detecting part estimates a presumed improper halt of the select lever based on the operating position and operating velocity of the select lever to output an improper signal.

Preferably, the improper halt detecting part detects the improper halt based on the operating force to output an improper halt signal.

Preferably, the improper halt detecting part detects the improper halt based on a select period to output an improper halt signal.

Preferably, the improper halt preventing part forbids a provision of the adjustment force when the improper halt detecting part detects that the select lever is manually operated during an improper halt prevention control period.

Preferably, the improper halt preventing part provides the select lever with the adjustment force in a direction opposite to an operating direction of the select lever when the improper halt detecting part detects a halt during an improper halt prevention control period.

Preferably, the improper halt preventing part provides the select lever with the adjustment force that changes adjustment directions of the adjustment force alternatively when the improper halt detecting part detects a halt during an improper halt prevention control period.

Preferably, the improper halt preventing part provides the select lever with the adjustment force so that the adjustment force increases in a range where reaction force acting on the select lever has a peak.

BRIEF DESCRIPTION OF THE DRAWINGS

The objects, features and advantages of the present invention will become apparent as the description proceeds when taken in conjunction with the accompanying drawings, in which.

DETAILED DESCRIPTION OF THE PREFERRED EMBODIMENTS

Figure 1:
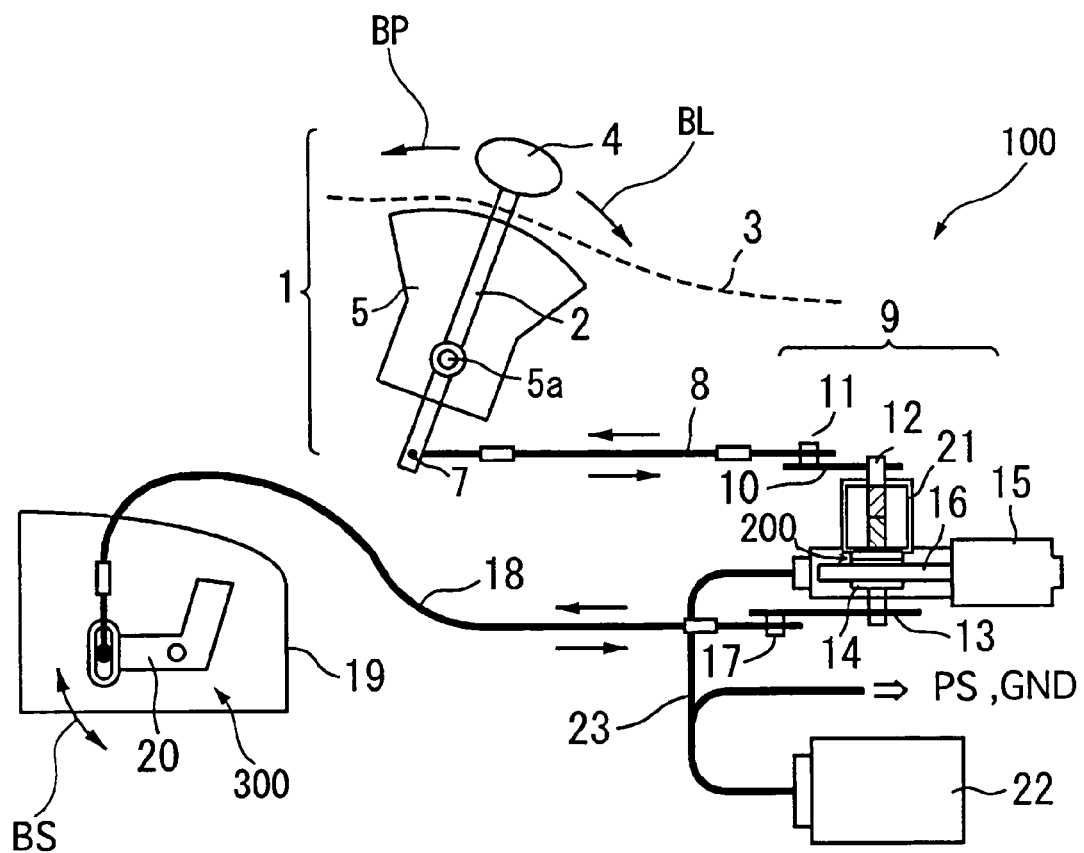
FIG. 1 is a schematic diagram showing a structure of an automatic transmission with an operating position select device of a preferred first embodiment according to the present invention.

Throughout the following detailed description, similar reference characters and numbers refer to similar elements in all figures of the drawings, and their descriptions are omitted for eliminating duplication.

An operating position select device of a first preferred embodiment according to the present invention will be described with reference to the accompanying drawings.

Referring to FIG. 1 of the drawing, there is shown an automatic transmission 19 and an operating position select device 100 to control the transmission 19.

The automatic transmission 19 is a conventional multi-speed transmission with a plurality of planetary gear sets, not shown, and operated among a plurality of operation modes, for example, a parking mode, a reverse drive mode, a neutral mode, a forward drive mode, and a forward low gear drive mode.

The automatic transmission 19 is provided with the operating position select device 100, which shifts the operation modes to a desirable operation mode by manually selecting a select lever 2 of the select device 100.

The operating position select device 100 includes a select lever unit 1 manually operated by a driver, an operating angle sensor 200 for detecting an operating angle of the select lever 2, an mode shift unit 300 mounted on the automatic transmission 19, a first and second control cables 8 and 18 connecting the select lever 2 to the mode shift unit 300, an assist actuator 9 for assisting operating force inputted to the select lever 2 by the driver, an operating torque sensor 200 for detecting operating force applied to the select lever 2, and a control unit 22 for controlling the assist actuator 9.

The select lever unit 1 is arranged, for example, at a center console 3 beside a driver's seat and has the select lever 2 operated by the driver, a bracket 5 fixed to a vehicle body, a supporting shaft Sa fixed on the bracket 5 so as to swingably support the select lever 2, a knob 4 that is mounted on the top of the select lever 2 so as to be held by a hand of the driver, and a checking mechanism, not shown, for ensuring the select lever 2 to be kept in a selected mode position.

The select lever 2 is set to be about 100 mm in length in this embodiment, which is shorter by about 250 mm than a conventional type select lever. The lever 2 is operatable by the driver swingably in a first direction toward a P position as indicated by an arrow $B_P$ and a second direction, opposite to the first direction, toward a L position as indicated by an arrow $B_L$.

The select lever 2 can be positioned in one of select positions: the P position corresponding to the parking mode of the automatic transmission 19, an R position corresponding to the reverse drive mode, an N position corresponding to the neutral mode, a D position corresponding to the forward drive mode, and the L position corresponding to the forward low geared drive mode.

Figure 2:
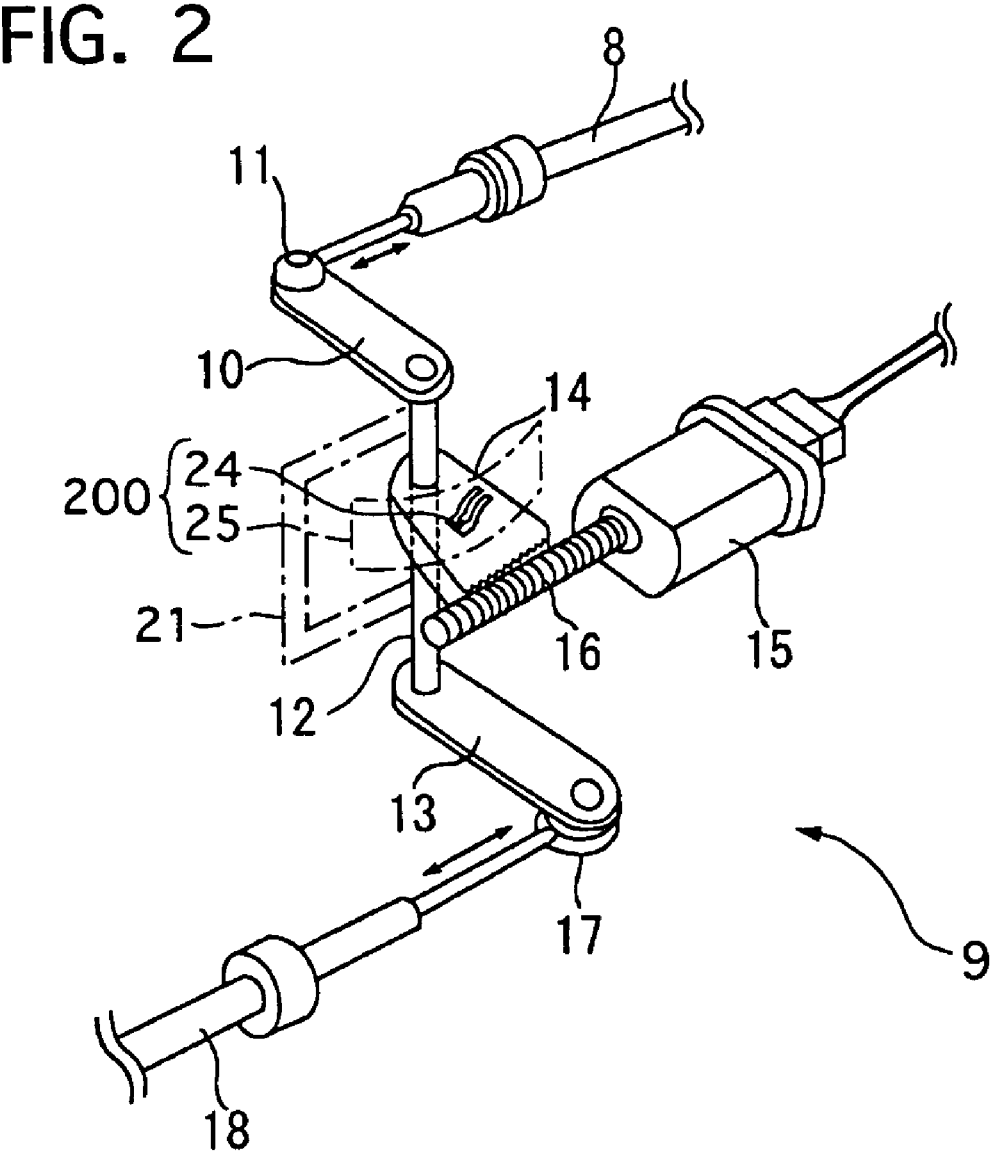
FIG. 2 is an enlarged perspective view showing an assist actuator that is used in the operating position select device shown in FIG. 1.

The assist actuator 9, as shown in FIGS. 1 and 2, includes an electric motor 15 with reduction gears reducing rotation speed of an output shaft of the motor 15, a worm 16 that is formed on the outer peripheral surface of the output shaft, and a worm wheel 14 that is in mesh with the worm 16 and integrally united to the coupling shaft 12 coupling the first and second control cables 8 and 18.

The worm wheel 14 is provided on its upper surface with an electric terminal 24 contacting to a carbon resistor 25, indicated by a dashed line in FIG. 2, that is printed on a substrate fixed to a case of the assist actuator 9. The electric terminal 24 and the carbon resistor 25 constitute the operating angle sensor 200 for detecting an operating angle of the select lever 2 to output an operating angle signal to the control unit 22.

The electric terminal 24 is movable together with and around the coupling shaft 12 to change its position with respect to the carbon resistor 25 that is immobile and detects a rotating angle of the coupling shaft 12 for outputting the operating angle signal. The operating angle signal is, for example, proportional to the operating angle of the select lever 2, both of which increase as the select lever 2 moves toward the L position, in the second direction $B_L$. The operating angle sensor 200 corresponds to an operating position sensor of the present invention, and the operating angle signal corresponds to an operating position signal of the present invention.

There is provided a torque sensor 21 attached to the coupling shaft 12 so as to detect the operating force applied to the select lever 2, which is proportional to operating torque applied to the coupling shaft 12. The torque sensor 21 detects the operating force based on relative torsion between the upper and lower portions of the coupling shaft 12 and outputs an operating force signal to the control unit 22. The operating force signal, for example, increases with the operating force applied to the select lever 2. The torque sensor 21 corresponds to an operating force sensor of the present invention.

Figure 3:
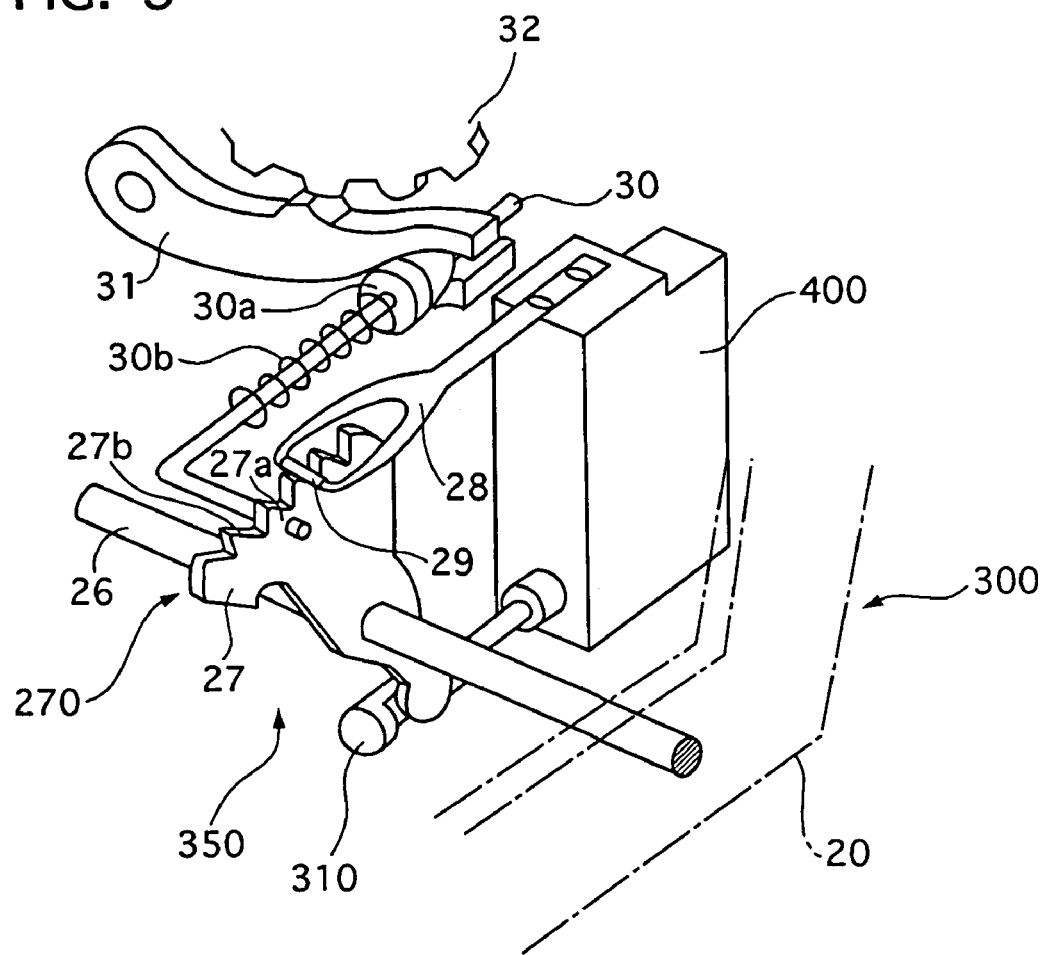
FIG. 3 is an enlarged perspective view showing a mode shift unit with a detent mechanism that is used in the operating position select device shown in FIG. 1.

The mode shift unit 300 shifts the operation modes of the automatic transmission 19 according to an operated position of the select lever 2. Referring to FIGS. 1 and 3 of the drawings, the mode shift unit 300 has a manual plate lever 20 and a detent mechanism 350 for keeping the manual plate lever 20 in a position selected by the select lever 2.

The manual plate lever 20 is integrally fixed in its intermediate portion with a rotary shaft 26, and connected at its one end portion with the second control cable 18 so as to be rotated on the shaft 26 with respect to a case of the transmission 19 according to select operation of the select lever 2. The rotary shaft 26 is fixed to a detent plate 27 of the detent mechanism 350.

The detent mechanism 350 includes the detent plate 27 with a cam 270, a detent pin 29 to be pressed onto the cam 270, and a spring plate 28 acting its spring force on the detent pin 29.

The detent plate 27 is mechanically connected with a valve spool 310 of a manual valve disposed in a control valve unit 400 of the automatic transmission 19 so as to move the spool 300 according to a select position.

The detent plate 27 is formed on its upper portion with the cam 270 having top portions 27a and bottom portions 27b. Each bottom portion 27b is arranged between the adjacent top portions 27a and corresponds with one of the five operation modes of the automatic transmission 19.

The cam 270 is pressed by the detent pin 29 that is urged by the spring plate 28. The spring plate 28 is mounted at its one end portion on the control valve unit 400 and supports the detent pin 29 at its other end portion. The spring plate 28 presses the detent pin 29 onto the cam 270 of the detent plate 27 so that the detent pin 29 is positioned in one of the bottom portions 27b to detain the valve spool 310 of the manual valve in the selected position.

The detent plate 27 is coupled at its cam side portion with a parking rod 30 having a wedge 30a that can press a parking pawl 31. The wedge 30a is movable along the rod 30 and presses the parking pawl 31 by spring force of a coil spring 30b so that the pawl 31 engages with a parking wheel 32 united to an output shaft of the automatic transmission 19 when the select lever 2 is shifted to the P position. This engagement of the pawl 31 and the wheel 32 results in locking drive wheels, not shown, for parking a motor vehicle.

The mode shift unit 300 is mechanically connected with the select lever 2 through the first and second control cables 8 and 18, and others. As shown in FIGS. 1 and 2, the first control cable 8 connects at its one end portion with a bottom portion of the select lever 2 through a first joint 7 and at the other end portion with one end portion of an input lever 10 through a second joint 11. The other end portion of the input lever 10 is connected with a top portion of a coupling shaft 12, whose bottom portion is connected with one end portion of an output lever 13. The other end portion of the output lever 13 is connected with one end portion of the second control cable 18 through a third joint 17. The other end portion of the second control cable 18 is, as shown in FIGS. 1 and 3, connected with the manual plate lever 20.

The first and second control cables 8 and 18, the first to third joints 7, 11, and 17, the input and output plates 10 and 13, and the coupling shaft 12 corresponds to a mechanically connecting means of the present invention.

The control unit 22 is electrically connected to a power supply PS, ground GND, the operating angle sensor 200, and the torque sensor 21. The control unit 22 receives the operating angle signal from the operating angle sensor 200 and the operating force signal from the torque sensor 21 to compute target assist current based on these signals, and drives the electric motor 15 under pulse width modulation (PWM) control based on the target assist current.

Figure 4:
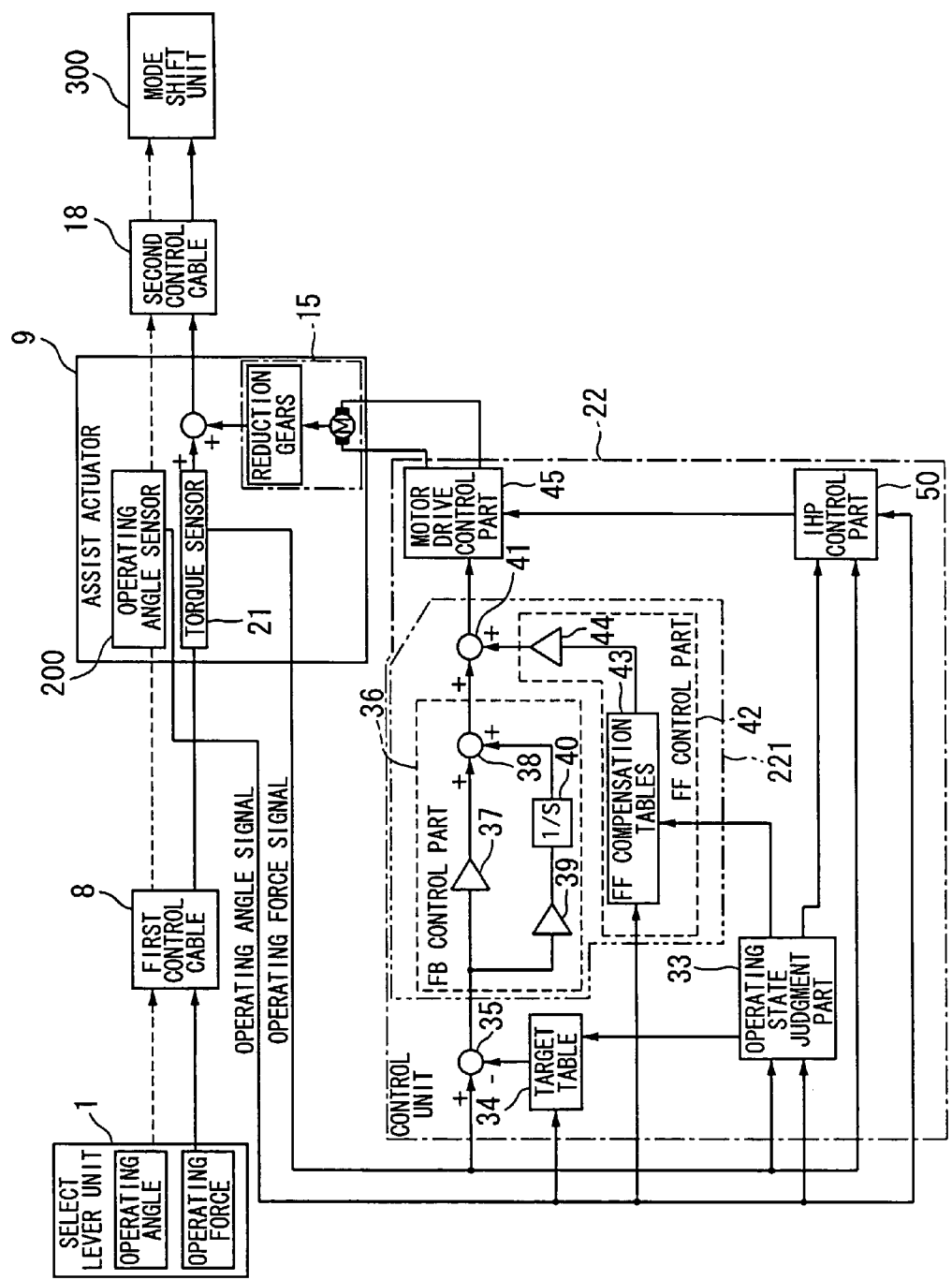
FIG. 4 is a control bock diagram of a control unit and its peripheral equipment that are used in the operating position select device shown in FIG. 1.

FIG. 4 shows a control block diagram of the control unit 22 and its related units. When the select lever 2 is shifted by a driver, the select lever 2 moves and changes its operating angle, and operating force applied to the lever 2 by the driver is transmitted to the mode sift unit 300 through the first and second control cables 8 and 18, and the coupling shaft 12.

The first control cable 8 rotates the coupling shaft 12, so that the terminal 24 on the worm wheel 14 united with the shaft 12 moves with respect to the carbon resistance 25 to change a relative angle between them. This relative angle, corresponding to an operating angle of the select lever 2, is detected by the operating angle sensor 200, which outputs an operating angle signal to the control unit 22.

Operating force applied to the select lever 2 is transmitted through the first control cable 8 to the coupling shaft 12 and twists it, so that torsion occurs between the upper and lower portions of the shaft 12. This torsion, corresponding to operating force applied to the select lever 2, is detected by the torque sensor 21, which outputs an operating force signal to the control unit 22.

The control unit 22 has an operating state judgment part 33 that judges a states of the select lever 2, an improper halt prevention (hereinafter referred to as "IHP") control part 50 that prevents the select lever 2 from being kept halted improperly between the select positions, a motor drive control part 45 that controls electric current to be supplied to the electric motor 15 of the assist actuator 9, and a main control part 221 including a feedback (hereinafter referred to as "FB") control part 36 and a feedforward (hereinafter referred to as "FF") control part 42.

The operating state judgment part 33 calculates the operating angle of the select lever 2 based on the operating angle signal outputted from the operating angle sensor 200 and obtains operating velocity and acceleration of the select lever 2 by computing differential of the operating angle and the operating velocity, respectively. Then, the judgment part 33 judges an operating start-up and an operating direction of the select lever 2 based on the operating angle, the operating velocity, and the operating force outputted from the torque sensor 21 and outputs a judgment result to the FF control part 42, a target table 34, and the IHP control part 50. The judgment part 33 also judges whether or not the select lever 2 is improperly halted and outputs an improper halt (hereinafter referred to as "IH") signal to an IHP control part 50 when the judgment result is YES. Here, "improper halt" referred as "IH" denotes that the select lever 2 is in a state of being halted between the select mode positions, not positioned in one of the select mode positions.

The FF control part 42 has FF compensation tables 43 and a multiplier 44. The FF compensation tables 43 determines FF current based on the operating angle, the operating velocity, and the operating acceleration and outputs an FF current signal to the multiplier 44, where multiplies the FF current signal by FF gain to output the multiplied FF assist current signal to a third adder 41.

The target table 34 receives the operating angle signal from the operating angle sensor 200 and an operating direction signal from the operating state judgment part 33 to determine target reaction force based on them. Then, the target table 34 outputs this target reaction force signal to a first adder 35. The target table 34 contains data on target reaction forces with respect to operating angles and directions.

The first adder 35 computes a difference between the operating force detected and the target reaction force by subtracting the target reaction force signal from the operating force signal and outputs its difference signal to the FB control part 36.

The FB control part 36 includes a first multiplier 37, a second adder 38, a second multiplier 39, and an integral element 40. The first multiplier 37 computes first proportional current by multiplying the difference signal by proportional gain and outputs a first proportional current signal to the second adder 38. The second multiplier 39 computes a second proportional current by multiplying the difference signal by an integral gain and outputs a second proportional signal to the integral element 40. The integral element 40 obtains integral current by calculating integration of the second proportional signal and outputs its integral current signal to the second adder 38. The second adder 38 adds the integral current signal to the first current signal and outputs an FB assist current signal to the motor drive control part 45.

The third adder 41 adds the FF assist current signal outputted from the FF control part 42 to the FB assist current signal outputted from the FB control part 36 and outputs a motor assist current signal to the motor drive control part 45.

The IHP control part 50 receives the operating angle signal from the operating angle sensor 200, the operating force signal from the torque sensor 21, and the IH signal from the operating state judgment part 33 and outputs an IHP signal to the motor drive control part 45 when the judgment part 33 judges an improper halt of the select lever 2.

The motor drive control part 45 receives the motor assist current signal from the third adder 41 and the IHP signal from the IHP control part 50 and outputs motor drive current determined based on these signals to the electric motor 15 under Power Width Modulation (PWM) control. In stead of the PMW control, the motor 15 may be driven under other controls, such as current control or armature voltage control.

The motor 15 applied motor torque to the coupling shaft 12 so as to obtain resultant force by adding its assist force to the operating force in the select operation, so that the resultant force moves the first and second control cables 8 and 18 to shift the mode shift unit 300 and keep the select lever 2 in a proper select position.

In the select device 100, when the operating position select unit 100 fails electrically because of a broken electric wire for example, the operating force of the select lever 2 is directly transmitted from the lever 2 to the mode shift unit 300 mechanically through the first and second control cables 8 and 18, the input and output levers 10 and 13 and the others, thereby enabling the mode shift unit 300 to shift the modes of the automatic transmission 19 although its operating force becomes larger than in a normal state.

Figure 5:
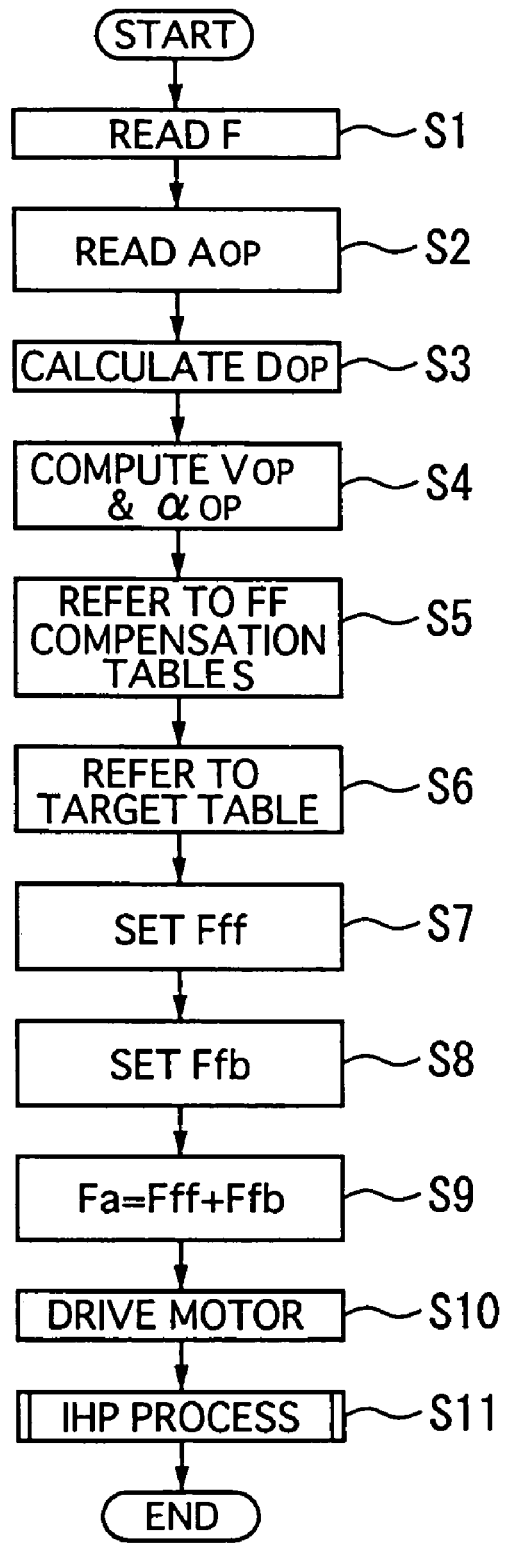
FIG. 5 is a flowchart of an assist process including an improper halt preventing process executed in the control unit for controlling the assist actuator during select operation.

FIG. 5 shows a flowchart of an assist process executed in the control unit 22 to control the assist actuator 9 when the select lever 2 is operated by the driver.

At step S1, the control unit 22 receives an operating force signal from the torque sensor 21 to read operating force F applied to the select lever 2, and then the flow goes to step S2.

At the step S2, the control unit 22 receives an operating angle signal from the operating angle sensor 200 to read an operating angle $A_{OP}$ of the select lever 2, and then the flow goes to step S3.

At the step S3, the operating state judgment part 33 calculates an operating direction $D_{OP}$ of the select lever 2 based on a difference between the operating angle signals that are read control-periodically from the operating angle sensor 200, and then the flow goes to step 4.

At the step S4, the judgment part 33 computes operating velocity $V_{OP}$ and operating acceleration $\alpha_{OP}$ based on the operating angle signals $A_{OP}$ that are read control-periodically from the operating angle sensor 200, and then the flow goes to step S5.

At the step S5, the FF control part 42 refers to the FF compensation tables 43 to select an optimum one from the tables 43 based on the operating angle $A_{OP}$, the operating velocity $V_{OP}$, and the operating acceleration $\alpha_{OP}$, and then the flow goes to step S6.

At the step S6, the operating state judgment part 33 refers to the target table 34 to obtain target reaction force, and then the flow goes to step S7.

At the step S7, the FF control part 42 sets FF assist force Fff by using the optimum table and outputs it to the third adder 41, and then the flow goes to step S8.

At the step S8, the FB control part 36 sets FB assist force Ffb based on the target reaction force and outputs it to the third adder 41, and then the flow goes to step S9.

At the step S9, the third adder 41 obtains target assist force Fa by adding the FF assist force Fff to the FB assist force Ffb and outputs the target assist force Fa to the motor drive control part 45, and then the flow goes to step S10.

At the step S10, the motor drive control part 45 outputs motor drive current controlled under PWM control to the electric motor 15, and then the flow goes to step S11.

At the step S11, the IHP control part 50 executes an IHP process if necessary, and then the flow ends. The IHP process will be described in detail later.

Figure 6:
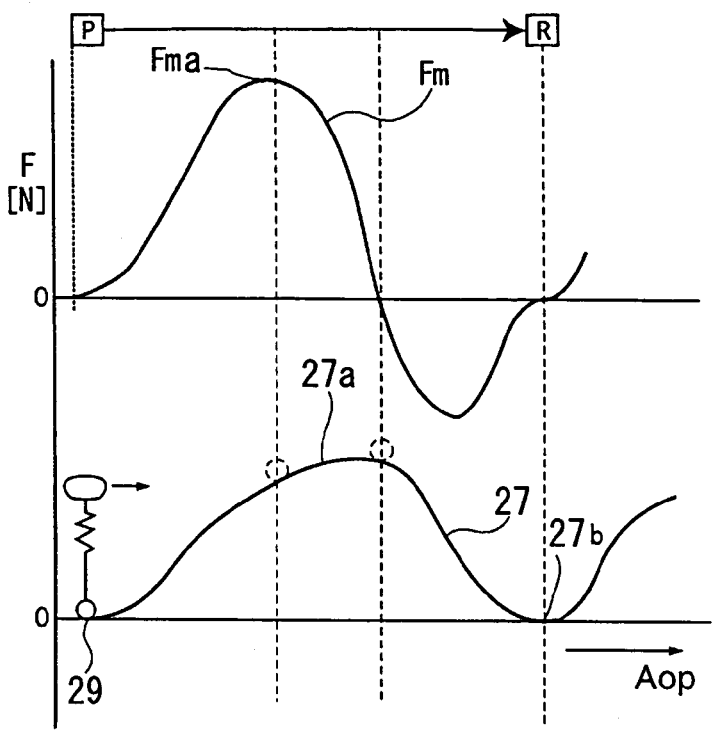
FIG. 6 is a schematic diagram showing relationships of reaction force acting on a select lever and a cam profile of the detent mechanism with respect to an operating angle when the select lever is shifted from P position to R position.
Figure 7:
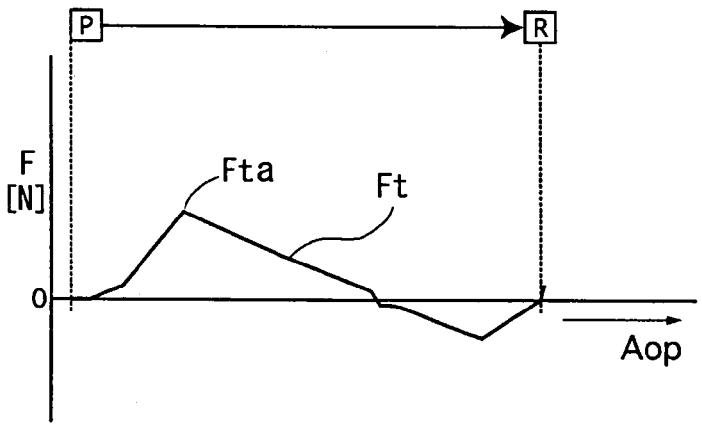
FIG. 7 is a schematic diagram showing a relationship between target reaction force and the operating angle when the select lever is shifted from the P position to the R position.
Figure 8:
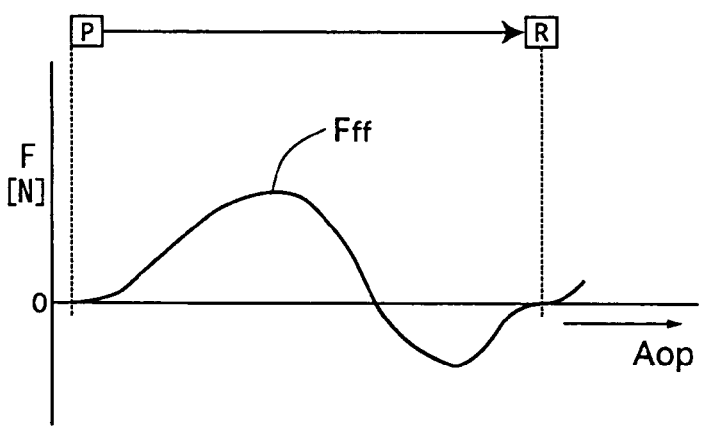
FIG. 8 shows a schematic diagram showing a relationship between feedforward assist force and the operating angle when the select lever is shifted from the P position to the R position.

FIGS. 6 to 8 show relationships of the reaction force Fm, the target reaction force Ft, and the FF assist force Fff with respect to the operating angle A$_{OP}$, respectively, during the select operation from the P position to the R position.

FIG. 6 show a characteristic of the reaction force Fm that acts on the knob 4 of the select lever 2 when the motor 15 is not driven in the select operation shifted from the P position to the R position. The reaction force Fm is generated by resultant force from the sum of friction force caused by the first and second cables 8 and 18, inertia force of the motor 15, spring force of the detent mechanism 350, and others. This reaction force Fm increases in a direction opposite to the operating direction of the lever 2 with the operating angle A$_{OP}$ to have its peak portion Fma before the detent pin 29 gets over the top portion 27a of the cam 270, and then decreases with increasing the angle A$_{OP}$.

After the pin 29 gets over the top portion 27a, the reaction force Fm acts on the select lever 2 in the operating direction so as to move it to the bottom portion 27b of the R position because the spring plate 28 applies its spring force through the detent pin 29 to the cam 270 to rotate, with pulling the select lever 2 into the bottom portion 27b of the R position. This denotes that the operating force applied to the select lever 2 needs to be larger than the reaction force Fm in order to manually move the select lever 2 for the select operation when the motor 15 is not driven.

FIG. 7 shows the characteristic of the target reaction force Ft, which is set based on the operating angle A$_{OP}$ so as to obtain high select operating performance. The target reaction force Ft is determined according to the reaction force shown in FIG. 6. Note that a peak portion Fta of the target reaction force Ft is short of the peak portion Fma of the reaction force Fm in this embodiment.

FIG. 8 shows an FF compensation table describing the characteristic of the FF assist force Fff with respect to the operating angle A$_{OP}$. In this table, the FF assist force is set to be about a half of the reaction force Fm shown in FIG. 6. This FF assist force Fff is added to the FB assist force Ffb to obtain the assist force Fa, which can provide with high response and robust stability even when the select lever 2 is sharply shifted with large difference between the operating force F and the target reaction force Ft.

In the above select operation, the select lever 2 is normally moved and positioned in a proper select position such as the R position, while it is occasionally positioned in an improper select position, for example, in an intermediate portion between the P and R positions. This comes from the following reason: The control unit 22 controls the electric motor 15 to drive when the operating force F detected differs from the target reaction force Fm, while it controls the motor 15 to stop when they becomes equal to each other. The latter control is normally performed when the select lever 2 reaches and halts in a proper select position, while it is occasionally performed when the select lever 2 is halted in an improper range, such as an intermediate portion between the select positions.

This improper halt of the select lever 2 results from, for example, manually stopping the select operation when the lever 2 is positioned in the intermediate portion, or applying operating force to the lever 2 in the direction opposite to the desired select position to balance it with the target reaction force in the middle of the select operation. These cases tend to occur at a range where the detent pin 29 is around the top portion 27a of the cam 270 because all of the operating force F, the assist force Fa, and the reaction force Fm become small when the pin 29 passes through the top portion 27a.

In order to remove the above IH problem, the IHP process is carried out in this operating position select device 100.

Figure 9:
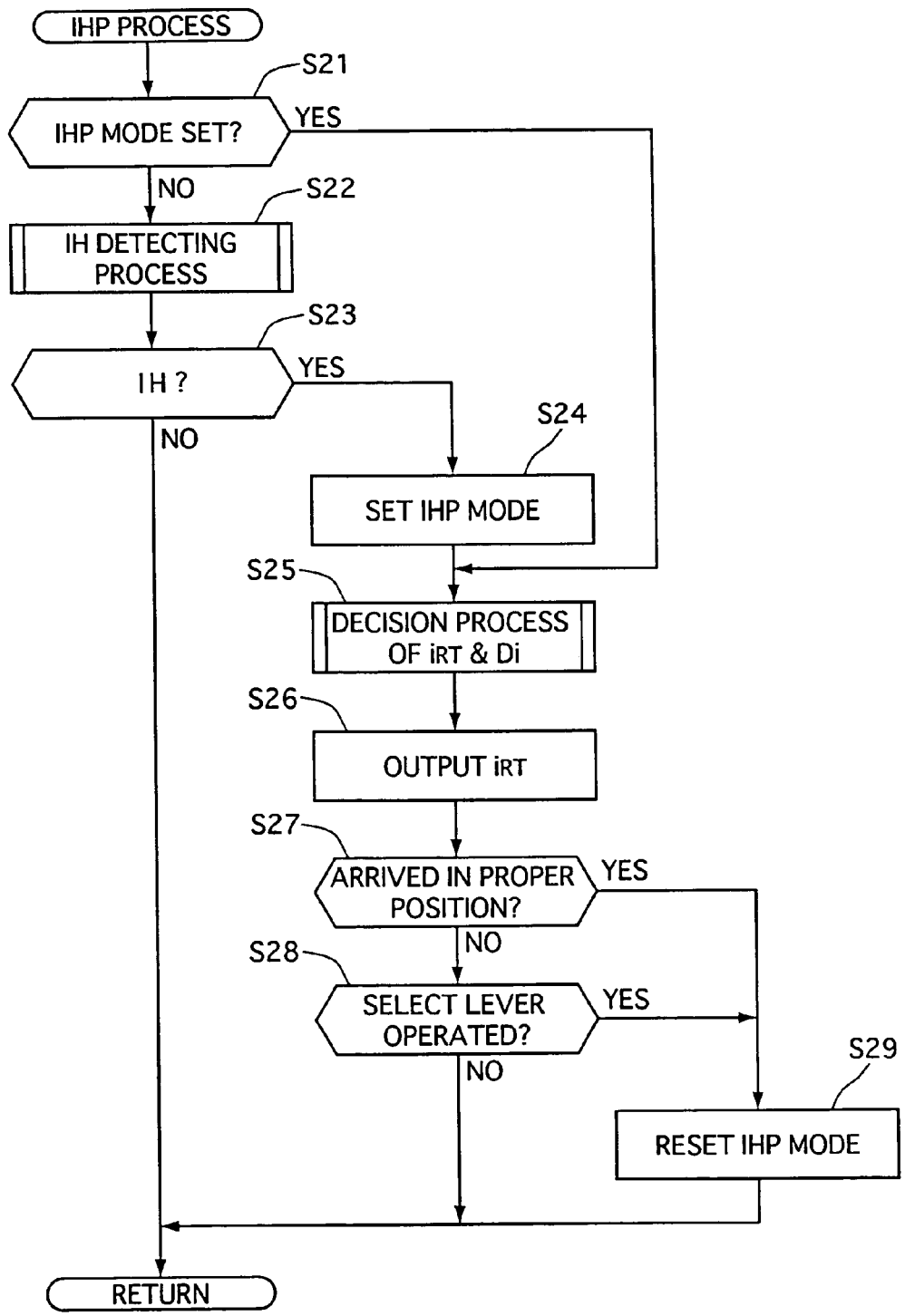
FIG. 9 is a flowchart of the improper halt prevention process executed at step S11 of the flowchart of the assist process shown in FIG. 5.

FIG. 9 shows a flowchart of the IHP process executed by the control unit 22 at the step S11 in the flowchart of the assist process shown in FIG. 5.

At step S 21, the IHP control part 50 judges whether or not an IHP mode is set. If YES, the flow goes to step S25, while, if NO, it goes to step S22.

At the step S22, the operating state judgment part 33 executes an IH detecting process, and then the flow goes to step S23. This IH detecting process will be described in detail later.

At the step S23, the judgment part 33 judges whether or not the select lever 2 is improperly halted based on the detected result obtained at the step S22 and the operating angle A$_{OP}$. If YES, the judgment part 33 outputs an IH signal to the control unit 50, and then the flow goes to step S24, while, if NO, the flow goes to RETURN.

At the step S24, the IHP mode is set in the control unit 50, and then the flow goes to the step S25.

At the step S25, the control part 50 computes adjustment current i$_{RT}$ and its adjustment direction Di based on the operating angle A$_{OP}$ and the operating velocity V$_{OP}$ so as to move the select lever 2 to the proper select position, and the flow goes to step S26. This decision process will be described in detail later.

At the step S26, the adjustment current i$_{RT}$ obtained at the step S25 is outputted to the motor drive control part 45, and then the flow goes to step S27.

At the step S27, the operating state judgment part 33 judges whether or not the select lever 2 arrives in the proper select position. If YES, the flow goes to step S29, while, if NO, the flow goes to step S28.

At the step S28, the judgment part 33 judges whether or not the select lever 2 is operated. If YES, the flow goes to the step S29, while, if NO, the flow goes to RETURN.

At the step S29, the IHP mode is reset, and then the flow goes to RETURN.

Figure 10:
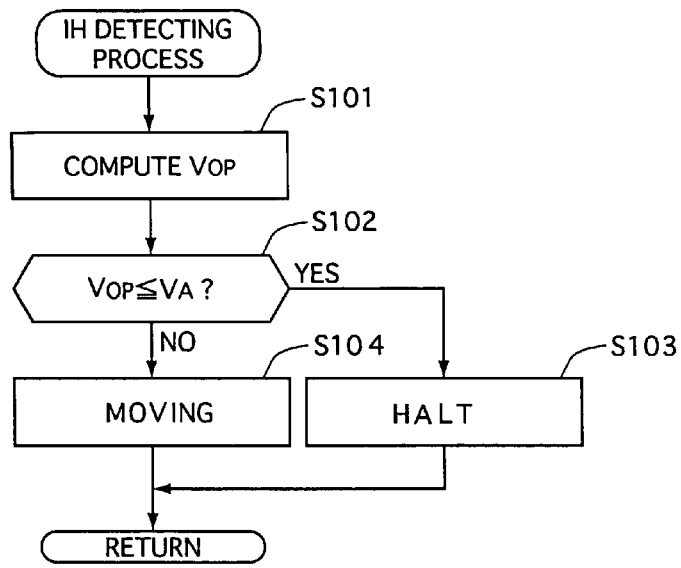
FIG. 10 is a flowchart of an improper halt detecting process executed at step S22 of the flowchart of the improper halt prevention process shown in FIG. 9.

FIG. 10 shows a flowchart of the IH detecting process executed at the step S22 in the flowchart of the IH process shown in FIG. 9.

At step S101, the operating state judgment part 33 computes the operating velocity V$_{OP}$ of the select lever 2, and then the flow goes to step S102. The step S101 corresponds to the step S4 in the flowchart of the assist process shown in FIG. 5.

At the step S102, the judgment part 33 judges whether or not the operating velocity V$_{OP}$ is equal to or smaller than set velocity V$_A$, minimum velocity from which operational movement of the select lever 2 can be detected certainly. If YES, the flow goes to step S103, while, if NO, the flow goes to step S104.

At the step S103, the judgment part 33 judges that the select lever 2 is halted and outputs an IH signal to the IHP control part 50, while, at the step S104, it judges that the lever 2 is moving, and then the flow goes to RETURN.

Figure 11:
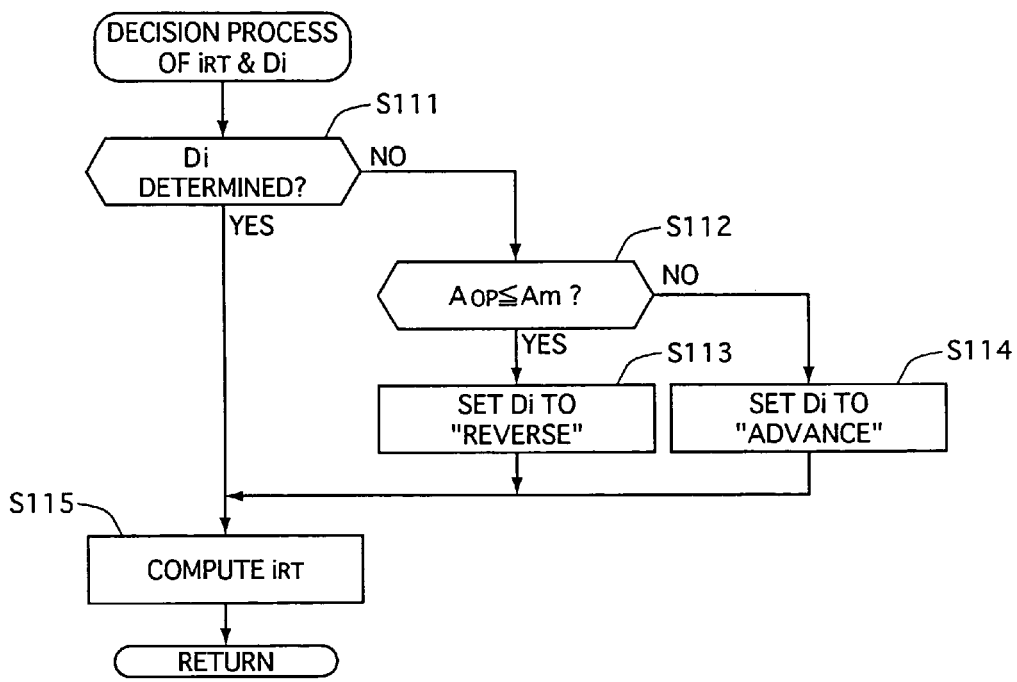
FIG. 11 is a flowchart showing an adjustment current and direction decision process executed at step S25 of the flowchart shown of the improper halt prevention process in FIG. 9.

FIG. 11 shows a flowchart of the adjustment current and direction decision process executed at the step S25 in the flowchart of the IHP process shown in FIG. 9 when the IHP control part 50 receives the IHP signal obtained at the step S103 of the flowchart shown in FIG. 10.

At step S111, the IHP control part 50 judges whether or not the adjustment direction Di is determined. If YES, the flow goes to step S115, while, if NO, the flow goes to step S112.

At the step S112, the control part 50 judges whether or not the operating angle $A_{OP}$ of the select lever 2 is equal or smaller than a set angle Am corresponding to the intermediate point where the reaction force becomes zero between the select positions. Namely, it judges whether or not the lever 2 is halted short of or at the intermediate point. If YES, the flow goes to step S113, while, if NO, the flow goes to step S114.

At the step S113, the adjustment direction Di is set to be "REVERSE" so that the motor 15 is driven to move the select lever 2 in the direction opposite to the operating direction of the lever 2 in the select operation, and then the flow goes to the step 115.

At the step S114, the adjustment direction Di is set to be "ADVANCE" so that the motor 15 is driven to move the lever 2 in the same direction as the operating direction, and then the flow goes to the step S115.

At the step S115, the control part 50 computes the adjustment current $i_{RT}$, and then the flow goes to RETURN.

In this operating position select device 100, the operating state judgment part 33 detects the halt of the select lever 2 based on its operating velocity $V_{OP}$, which can provide with accurate and rapid detecting of the movement of the lever 2 compared to that obtained by judging based on the operating angle $A_{OP}$. In this detection, the judgment part 33 judges the halt of the lever 2 by comparing the operating velocity $V_{OP}$ with the set velocity $V_A$, which eliminates misjudgment due to disturbance, such as vibration transmitted from a vehicle to the lever 2.

At the step S113, when judged that the lever 2 is halted short of the intermediate point, the motor 15 is driven to move the lever 2 back to the select position where the lever 2 starts. This moving the lever 2 back to the starting select position brings the driver to have a reasonable feeling because he or she can understand insufficiency of the operating force for the select operation.

At the step S114, when judged that the lever 2 is halted over the intermediate point, the motor 15 is driven to move the lever 2 forward in the same direction as the operating direction and reach the select position subsequent to the intermediate point. This moving the lever 2 forward o the subsequent select position brings the driver to have a reasonable feeling because he or she can understand applying large operating force to the lever 2.

This operating position select device 100 of the first embodiment has many advantages described below.

The select lever 2 can be shorter than a conventional one by about 150 mm at its portion projecting from a center console toward a passenger compartment without increasing an operating force applied to the select lever 2 so much. This brings a design freedom concerning an installation location of the select lever and/or a layout of a passenger compartment to be broadened.

When operating the select lever 2, assist torque from the electric motor 15 is applied to the coupling shaft 12 of the mechanically connecting mechanism so as to reduce the operating force applied to the select lever 2. When the operating position select unit 100 fails electrically, a driver can shift the mode shift unit 300 by operating the select lever 2 because the select lever 2 and the mode shift unit 300 are mechanically connected by the mechanically connecting mechanism, such as the first and second control cables 8 and 18 and the others.

The assist control of the motor 15 are performed by using the FF and FB assist currents, which gives high response to select operation.

When the select lever 2 is improperly halted between the select positions, the electric motor 15 of the assist actuator 9 can drive the lever 2 certainly to the select position. This improper halt can be prevented without other additional device, which gives lower manufacturing cost.

Next, an operating position select device of a second embodiment according to the present invention will be described with reference to the accompanying drawings.

This select device has a structure similar to that of the first embodiment shown in FIGS. 1 to 4, and executes process according to flowcharts similar to those shown in FIGS. 5 and 9 of the first embodiment except flowcharts of a IH detecting process and an adjustment current and direction decision process, differing from those shown in FIGS. 10 and 11.

Figure 12:
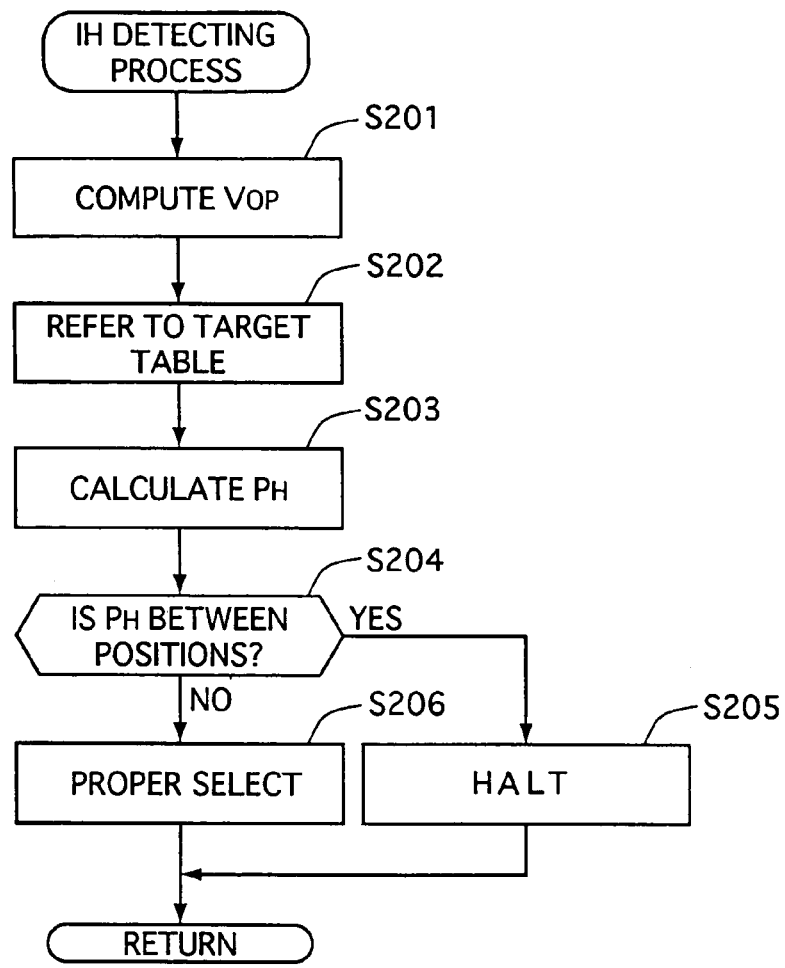
FIG. 12 is a flowchart showing an improper halt detecting process according to a second embodiment of the present invention, which is executed at the step S22 of the flowchart of the improper halt prevention process shown in FIG. 9.

FIG. 12 shows the flowchart of the IH detecting process executed in an IHP process similar to that shown in FIG. 10.

At step S201, an operating state judgment part 33 computes an operating velocity $V_{OP}$ of a select lever 2, and then the flow goes to step S202. The step S201 corresponds to the step S4 in the flowchart of the assist process shown in FIG. 5, At the step S202, target reaction force Ft is obtained by referring to a target table 34 based on an operating angle $A_{OP}$, and then the flow goes to step S203.

At the step S203, a presumed halt position $P_H$ of the select lever 2 is calculated based on the operating velocity $V_{OP}$ and the target reaction force Ft, and then the flow goes to step S204.

At the step S24, the judgment part 33 judges whether or not the presumed halt position $P_H$ is between the proper select positions. If YES, the flow goes to step S205, while, if NO, the flow goes to step 206.

At the step S205, the judgment part 33 judges that the select lever 2 is improperly halted between the select positions and outputs an IH signal to an IHP control part 50, while at the step S206 it judges that the lever 2 will reach an proper select position, and then the flow goes to RETURN.

Figure 13:
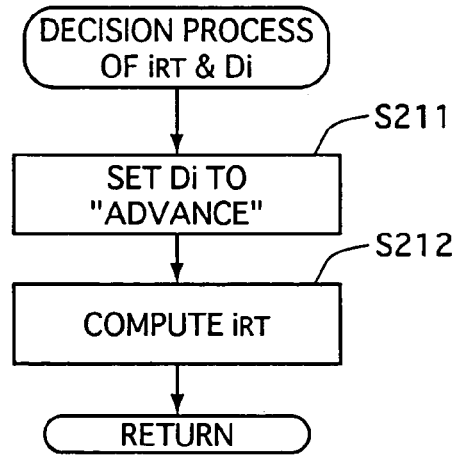
FIG. 13 is a flowchart showing an adjustment current and direction decision process according to the second embodiment of the present invention, which is executed at the step S25 of the flowchart of the improper halt prevention process that is shown in FIG. 9 and employed in the second embodiment.

FIG. 13 shows the flowchart of the adjustment current and direction decision process executed by the IHP control part 50 when it receives the IH signal generated at the step S205 in the flowchart shown in FIG. 12 from the judgment part 33.

At step S211, the operating direction Di is set to be "ADVANCE", and the flow goes to step S212.

At the step S212, an adjustment current $i_{RT}$ is computed, and then the flow goes to RETURN.

In this operating position select device, the operating state judgment part 33 estimates the presumed improper halt of the select lever 2 based on the operating velocity $V_{OP}$ and the target reaction force Ft, so that the IHP control part 50 can prevent the select lever 2 from being kept halted improperly between the select positions and control the motor 15 to move the lever 2 to the proper select position before it is actually halted at the improper position. The lever 2, therefore, moves without a halt to the proper select position, which brings a driver to have a reasonable feeling of the select operation.

Next, an operating position select device of a third embodiment according to the present invention will be described with reference to the accompanying drawings.

Figure 14:
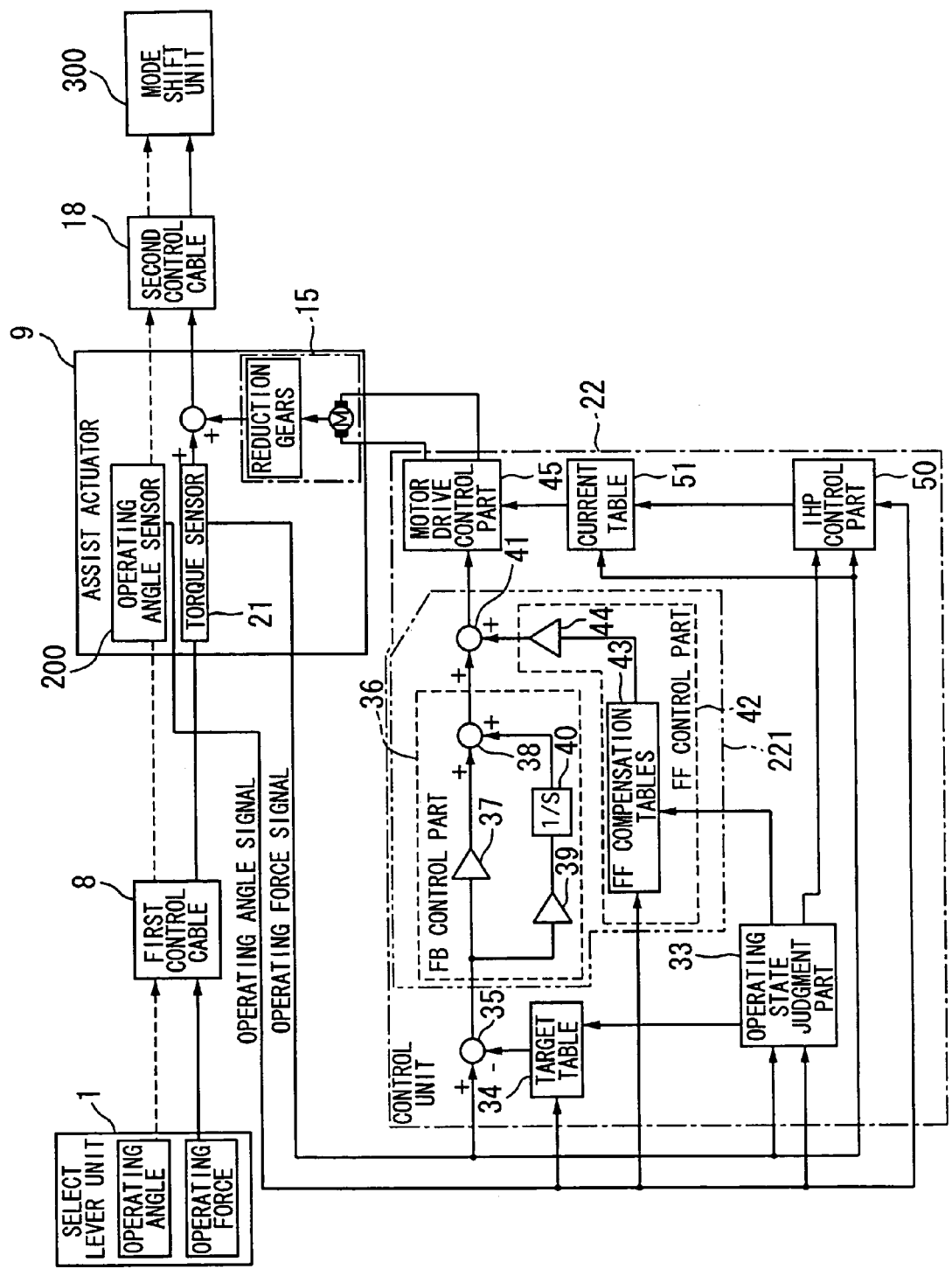
FIG. 14 is a control bock diagram of a control unit and its peripheral equipment of a third embodiment of the present invention, which are used in the operating position select device that is shown in FIG. 1 and employed in the third embodiment.

This select device has a structure similar to that of the first embodiment shown in FIGS. 1 to 4 except that as shown in FIG. 14 a control unit 22 has a current table 51 arranged between an IHP control part 50 and a motor drive control part 45 and containing data on adjustment current and direction. It executes process according to flowcharts similar to those shown in FIGS. 5 and 9 of the first embodiment except flowcharts of an IH detecting process and an adjustment current and direction decision process, differing from those shown in FIGS. 10 and 11 of the first embodiment.

In this control unit 22, optimum adjustment current $i_{RT}$ and direction Di can be determined based on an operating angle $A_{OP}$ by using the current table 51.

Figure 15:
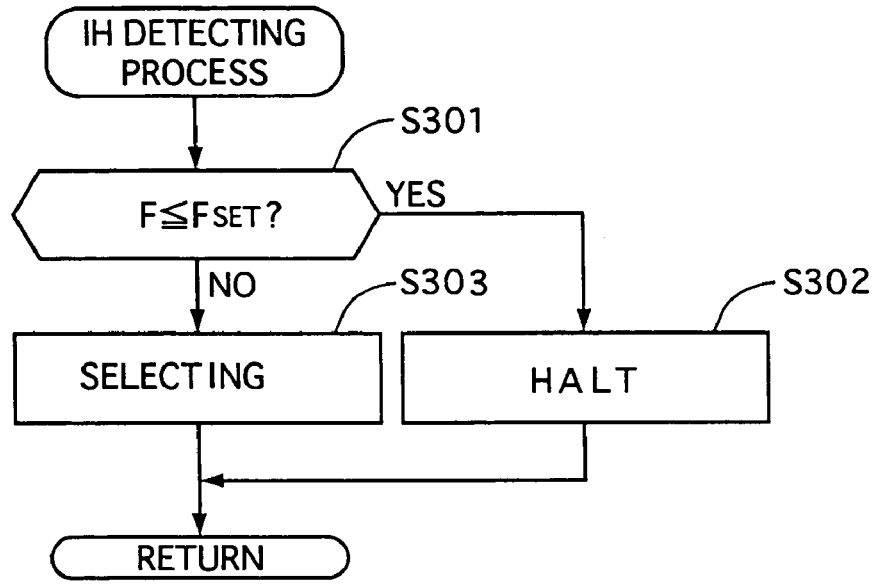
FIG. 15 is a flowchart of an improper halt detecting process executed in the control unit shown in FIG. 14.

FIG. 15 shows the flowchart of the IH detecting process executed in an IHP process similar to that shown in FIG. 9.

At step S301, the operating state judgment part 33 reads operating force F acting on a select lever 2, which is detected by a torque sensor 21 at the step S1 in the flowchart of the assist process shown in FIG. 5, and judges whether or not the operating force F is equal to or smaller than set force $F_{SET}$, minimum force from which operation of the select lever 2 can be detected certainly even when disturbance, such as vibration transmitted from a vehicle, acts on the lever 2. If YES, the flow goes to step S302, while, if NO, the flow goes to step S303.

At the step S302, the judgment part 33 judges that the select lever 2 is halted and outputs an IH signal to an IHP control part 50, while at the step S303, it judges that the lever 2 is being operated to move, and then the flow goes to RETURN.

Figure 16:
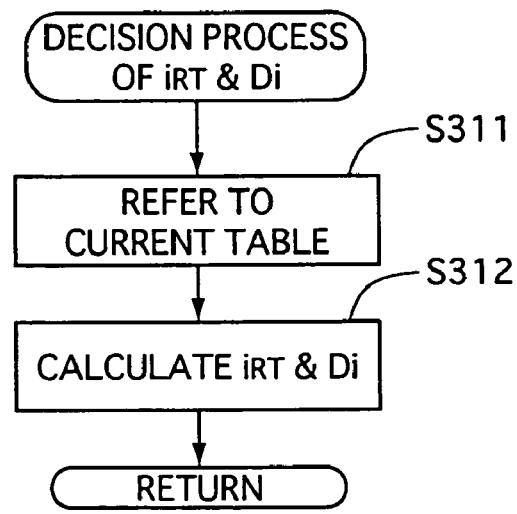
FIG. 16 is a flowchart of an adjustment current and direction decision process executed in the control unit shown in FIG. 14.

FIG. 16 shows the flowchart of the adjustment current and direction decision process executed by the IHP control part 50 when it receives the IH signal generated at the step S302 in the flowchart shown in FIG. 15 from the judgment part 33.

Figure 17:
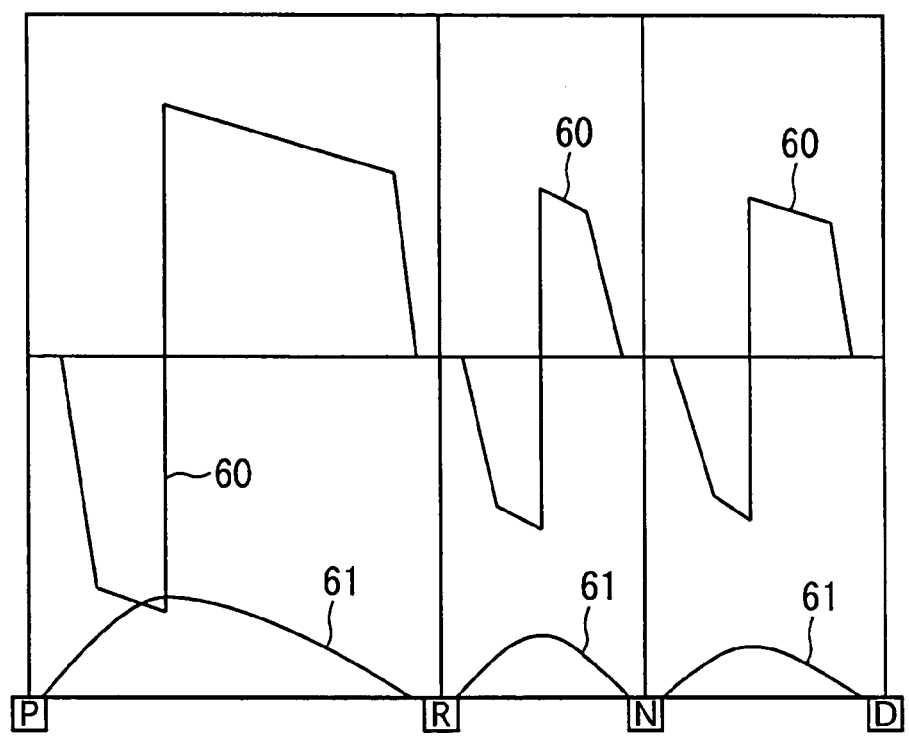
FIG. 17 is a schematic diagram that describes a relationship of the adjustment current and the cam profile of the detent mechanism with respect to the operating angles between the P position and a D position, whose data is stored in a current table of the control unit.

At step S311, the IHP control part 50 refers to the current table 51, and then the flow goes to step S312. The current table 51 has data on the adjustment current $i_{RT}$ and direction Di with respect to the operating angle $A_{OP}$ as shown in FIG. 17, where the adjustment current $i_{RT}$ is indicated by a line 60 whose height indicates a value of the current $i_{RT}$, and its adjustment direction Di is expressed by a location of the line 60; when in upper half, it becomes "ADVANCE", and when in the lower half, it becomes "REVERSE." The line 61 indicates a configuration of a cam formed on detent plate of a detent mechanism.

At the step S311, the adjustment current $i_{RT}$ and direction Di is calculated based on the operating angle $A_{OP}$ by using the current table 51, and then the flow goes to RETURN.

In this select device, the operating state judgment part 33 detects the improper halt of the select lever 2 based on the operating force F, so that the IHP control part 50 can prevent the select lever 2 from being kept halted improperly between the select positions and control the motor 15 to move the lever 2 to the proper select position. The current table 51 can promote performing speed of the decision process of the adjustment current and direction.

Next, an operating position select device of a fourth embodiment according to the present invention will be described with reference to the accompanying drawing.

This select device has a structure similar to that of the third embodiment and executes process according to flowcharts similar to the flowcharts of the third embodiment except a flowchart of an adjustment current and direction decision process when an operating state part 33 judges that a select lever 2 is in an improper range.

Figure 18:
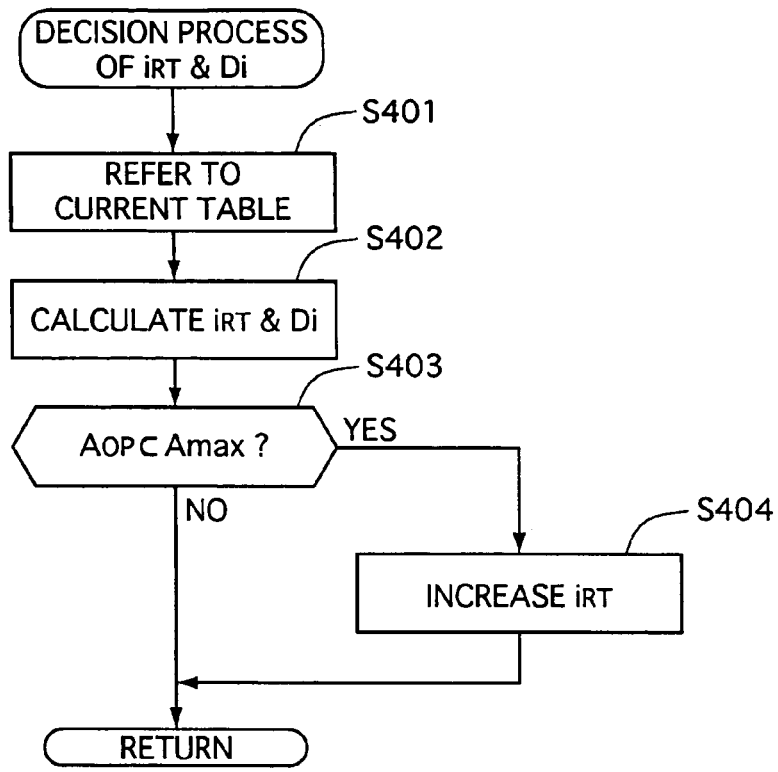
FIG. 18 is a flowchart of an adjustment current and direction decision process according to a fourth embodiment of the present invention.

FIG. 18 shows the flowchart of the adjustment current and direction decision process.

At step S 401, the IHP control part 50 refers to a current table S401, and the flow goes to step S402.

At the step S402, the control part 50 calculate optimum adjustment current $i_{RT}$ and direction Di based on an operating angle $A_{OP}$ obtained at the step S2 of the flowchart shown in FIG. 5, and the flow goes to step S403.

At the step S403, the control part 50 judges whether or not the operating angle $A_{OP}$ detected is included in the set operating angle range Amax where reaction force acting on the lever 2 has the largest value or its close values. The range Amax corresponds to the peak portion Fta of the target reaction force Ft shown in FIG. 7. If YES, the flow goes to step S404, while, if NO, the flow goes to RETURN.

At the step S404, the IHP control part 50 increases adjustment current $i_{RT}$, and then the flow goes to RETURN.

In this select device, the IHP control part 50 increases the adjustment current $i_{RT}$ when the select lever 2 is positioned n the range where the target reaction force becomes the largest value or its close ones. This brings the lever 2 to be positioned in the proper select position, getting over the peak reaction range.

Next, an operating position select device of a fifth embodiment according to the present invention will be described with reference to the accompanying drawings.

This select device has a structure similar to one of those of the first to fourth embodiment. It executes process according to flowcharts similar to one of those of the first to third embodiments except flowcharts of an IH detecting process and an adjustment current and direction decision process.

Figure 19:
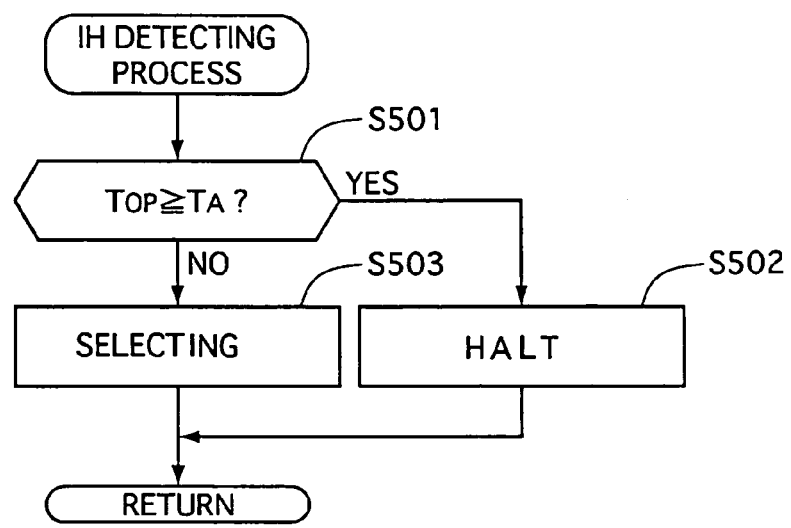
FIG. 19 is a flowchart of an improper halt detecting process according to the fourth embodiment.

FIG. 19 shows the flowchart of the IH detecting process executed by an operating state judgment part 33.

At step S501, the judgment part 33 judges whether or not a select period $T_{OP}$ is equal to or longer than a set period $T_A$ that is enough for performing normal select operation. If YES, the flow goes to step S502, while, if NO, the flow goes to step S503.

At the step S502, the judgment part 33 judges that a select lever 2 is improperly halted between select positions and output an IH signal to an IHP control part 50, and then the flow goes to RETURN.

At the step S503, the judgment part 33 judges that the select lever 2 is halted in a proper select position, and then the flow goes to RETURN.

Figure 20:
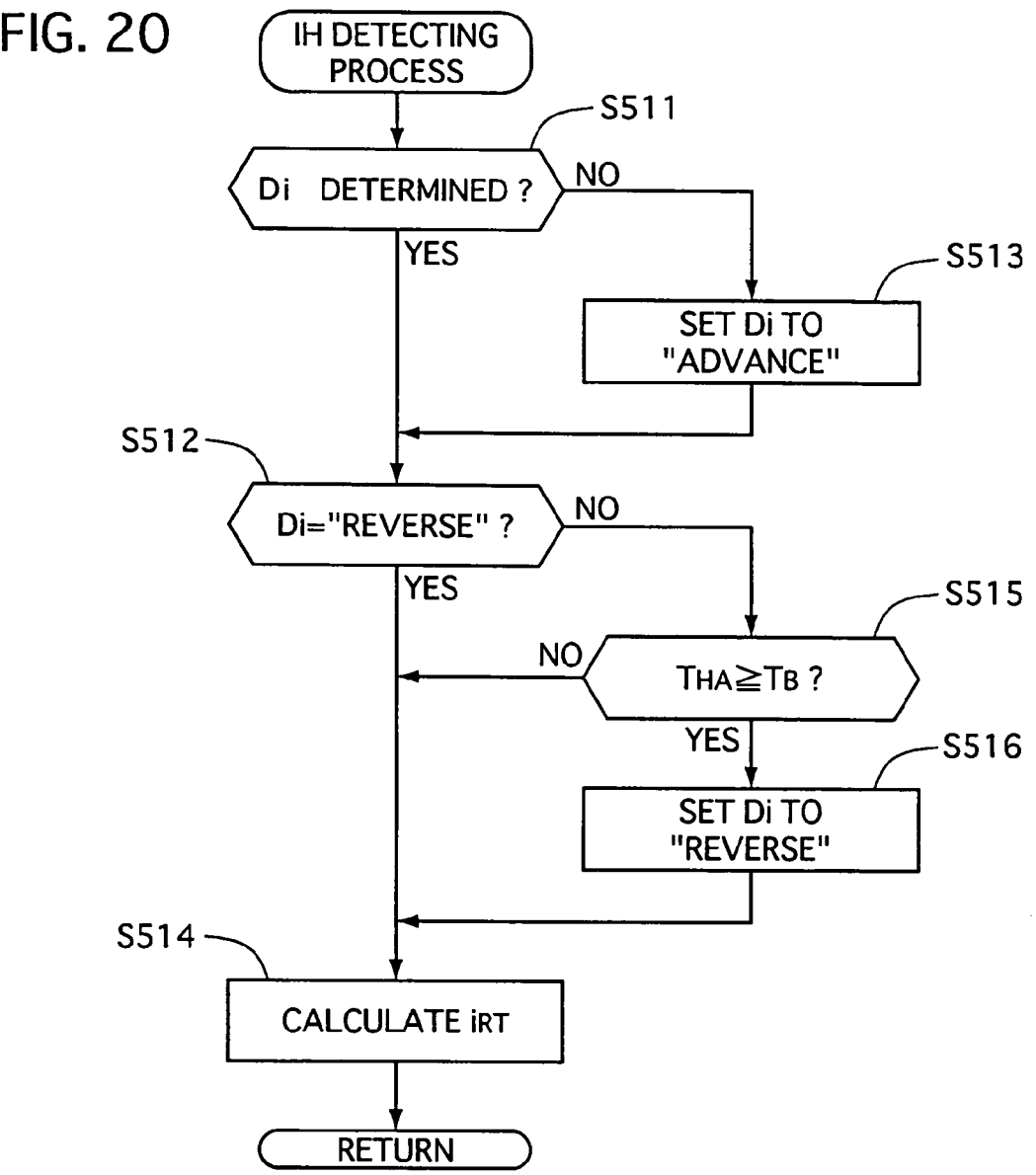
FIG. 20 is a flowchart an adjustment current and direction decision process according to a fifth embodiment of the present invention.

FIG. 20 shows the flowchart of the adjustment current and direction decision process that is executed when the control part 50 receives the IH signal generated at the step S502 of the flowchart shown in FIG. 19 from the judgment part 33.

At step S511, the control part 50 judges whether or not an adjustment direction Di is determined. If YES, the flow goes to step S512, while, if NO, the flow goes to step S513.

At the step S513, the adjustment direction Di is set to be "ADVANCE," and then the flow goes to the step S512.

At the step S512, the control part 50 judges whether or not the adjustment direction Di is set to be "REVERSE." If YES, the flow goes to step S514, while, if NO, the flow goes to step S515.

At the step S514, adjustment current $i_{RT}$ is calculated, and then the flow goes to RETURN.

At the step S 515, the control part 50 judges whether or not a halt period $T_{HA}$ when the lever 2 is halted is equal to or longer than a set halt period $T_B$. The set halt period $T_B$ is set so that lock of an electric motor 15 of an assist actuator 9 can be detected at the step 515. If YES, the flow goes to step S516, while, if NO, the flow goes to the step S514.

At the step S516, the adjustment direction Di to be "REVERSE," and then the flow goes to the step S514 so as to calculate the adjustment current $i_{RT}$.

In this select device, the operating state judgment 33 judges the halt of the select lever 2 based on select period $T_{OP}$, which can reduce judging time of the halt.

The IHP control part 50 controls the motor 15 to change its driving direction when the select lever 2 is halted during the IHP control process, which can remove burn-out of the motor 15 due to the lock of it and move the lever 2 certainly in the proper select position.

Next, an operating position select device of a sixth embodiment according to the present invention will be described with reference to the accompanying drawing.

This select device has a structure similar to that of the third embodiment shown in FIGS. 1 to 3 and 14. It executes process according to flowcharts similar to those of the third embodiment except flowcharts of an adjustment current and direction decision process.

Figure 21:
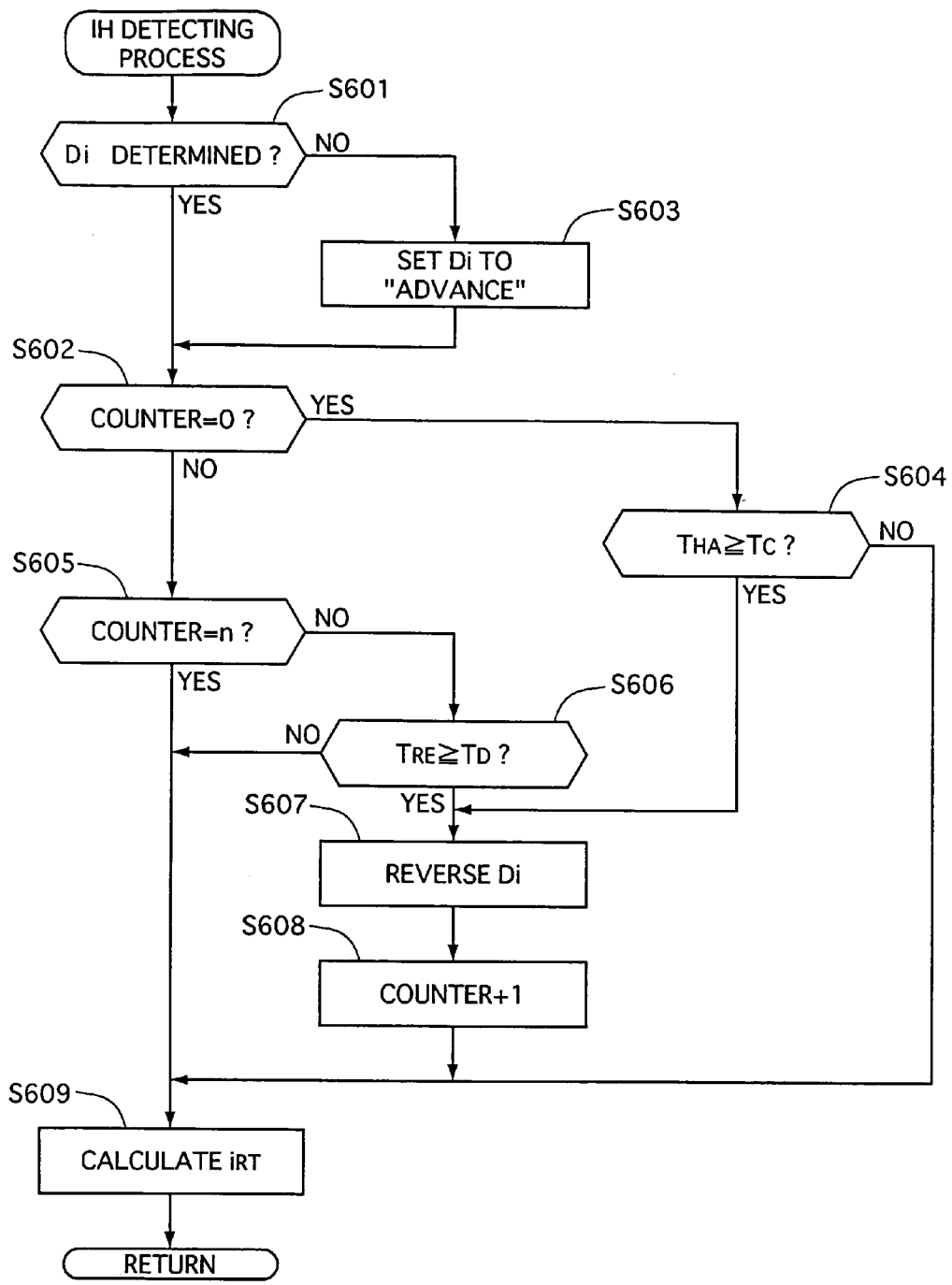
FIG. 21 is a flowchart of an adjustment current and direction decision process according to the sixth embodiment.

FIG. 21 shows the flowchart of the adjustment current and direction decision process executed by an IHP control part 50 when it receives an IH signal from an operating state judgment part 33.

At step S 601, the IHP control part 50 judges whether or not an adjustment direction Di is determined. If YES, the flow goes to step S 602, while, if NO, the flow goes to step S 603.

At the step S603, the adjustment direction Di is set to be "ADVANCE," and then the flow goes to the step S602.

At the step S 602, the control part 50 judges whether or not a counter value is zero. If YES, the flow goes to step S604, while, if NO, the flow goes to step S605. The counter value is stepped in increments of one every time when the lever 2 is assisted to move in the "ADVANCE" direction, and reset when this IHP control process is performed.

At the step S604, the control part 33 judges whether or not a halt period $T_{HA}$ is equal to or longer than a set halt period $T_C$. The set halt period $T_C$ is set so that lock of an electric motor 15 of an assist actuator 9 can be detected at the step 604. The set halt period $T_C$ may have the same length as that of the set halt period $T_B$ used in the flowchart of the fifth embodiment shown in FIG. 20. If YES, the flow goes to step S607, while, if NO, the flow goes to the step S609.

At the step S605, the control part 50 judges whether or not the counter value becomes n, positive integer number, where n is 3 to 5, for example. If YES, the flow goes to the step 609, while, if NO, the flow goes to step S606.

At the step S606, the control part 50 judges whether or not a reversing period $T_{RE}$ is equal to or longer than a set period $T_D$. If YES, the flow goes to step S607, while, if NO, the flow goes to the step S609. The reversing period is set to keep the motor driving in "ADVANCE" or "REVERSE" direction when the select lever 2 is halted during the IHP control.

At the step S607, the adjustment direction Di of the adjustment current $i_{RT}$ is reversed from one of the "ADVANCE" and "REVERSE" directions to the other of them, and then the flow goes to step S608.

At the step S608, the counter value is incremented by one, and then the flow goes to the step S609.

At the step S609, the adjustment current $i_{RT}$ is calculated, and then the flow goes to RETURN.

These alternatively-reversed adjustment currents are outputted until the counter value becomes n, to change adjustment directions, forward and backward, of adjustment forces acting on the select lever. This brings the select lever 2 to be kept halted improperly between the select positions during the IHP control process.

In the above embodiments, the operating state judgment part 33 executing the IH detecting process corresponds to an improper halt detecting part of the present invention. The IHP control part 50 executing the IHP control process corresponds to an improper halt preventing part of the present invention.

While there have been particularly shown and described with reference to preferred embodiments thereof, it will be understood that various modifications may be made therein, and it is intended to cover in the appended claims all such modifications as fall within the true spirit and scope of the invention.

For example, the operating force F may be detected based on an estimate from supply current to the motor 15 and its rotational speed in stead of using the torque sensor 21.

The mechanically connecting mechanism may be rods or linkage instead of the first and second control cables 8 and 18 in the above embodiments. The select lever may be of a shape different from the above embodiments.

The select lever may have a configuration different from that of the first embodiment shown in FIG. 1, for example, a finger-controable one.

The configuration of the cam of the detent mechanism may be formed arbitrarily to have different target reaction force.

Time process executed in a software may be performed by a timer built in an electronic circuits of a control unit.

The ratio of the FF assist force Fff to the FB assist force Ffb may be set arbitrarily according to a target operating characteristics.

Figure 22:
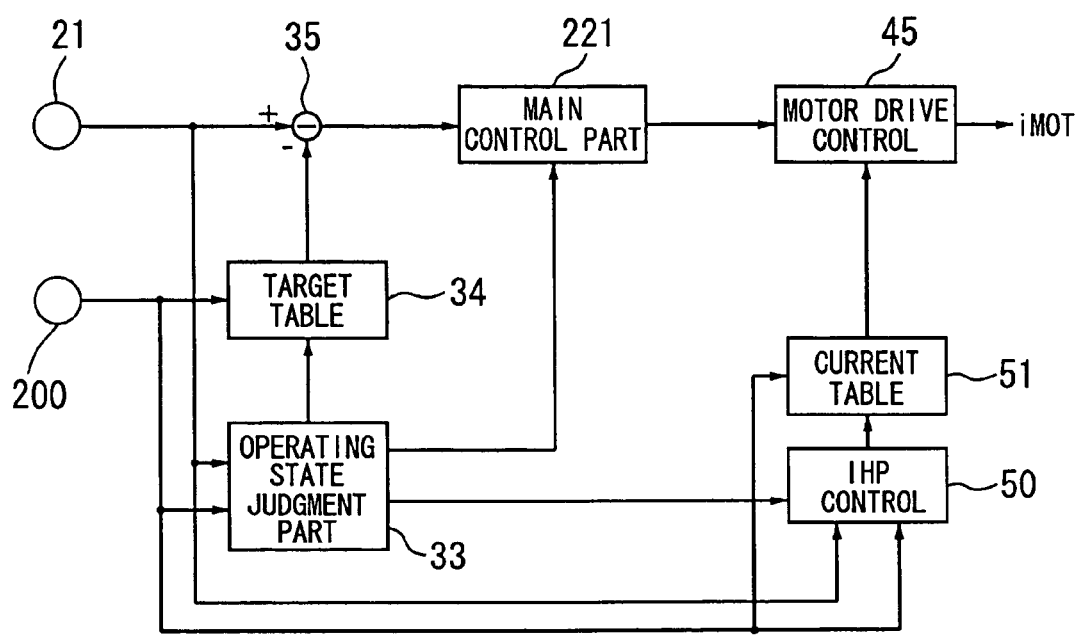
FIG. 22 is a control block diagram of a control unit that is modified based on the control block diagram of the control unit of the third embodiment shown in FIG. 14.

As shown in FIG. 22, the main control part 221 may be modified to have controlling elements different from that of the first embodiment shown in FIG. 4. For example, the main control part 221 may have only FB control part.

The assist force produced by the electric motor may be controlled based on at least the operating angle $A_{OP}$.

The operating position can be detected by the displacement amount of the select lever 2 or the mechanically connecting mechanism 400 that connects the select lever 2 and the mode shift unit 300 with each other instead of the operating angle of the shift lever 2.

The entire contents of Japanese Patent Application (Tokugan) No. 2003-369416 filed Oct. 29, 2003 is incorporated herein by reference.

What is claimed is:

1. An operating position select device for an automatic transmission whose operation modes are shiftable, the operating position select device comprising:

a select lever unit having a select lever that is operated by a driver between a plurality of select positions corresponding to the operation modes;

an operating position sensor that detects an operating position of said select lever and outputs an operating position signal;

a mode shift unit mounted on the automatic transmission to shift operation modes of the automatic transmission;

a mechanically connecting means that mechanically connects said select lever and said mode shift unit with each other;

an assist actuator that is arranged between said select lever and said mode shift unit and supplies assist force to said shift lever;

an operating force sensor that detects operating force acting on said select lever; and a control unit that controls said assist actuator based on at least the operating position signal, said control unit having an improper halt detecting part that detects the improper halt of said select lever between the select positions and an improper halt preventing part that prevents said select lever from being kept halted improperly between the select positions and provides said select lever with adjustment force so that said select lever moves to one of the select positions when the improper halt of said select lever is detected during select operation.

2. An operating position select device for an automatic transmission as set forth in claim 1,
wherein the improper halt preventing part outputs an improper halt prevention signal so that said assist actuator moves said select lever to the one of the select positions when the improper halt preventing part receives an improper halt signal from the improper halt detecting part.

3. An operating position select device for an automatic transmission as set forth in claim 2,
wherein the adjustment force acts on said select lever to move to the one of the select positions that is nearer to a position where the improper halt of said select lever is detected by the improper halt detecting part.

4. An operating position select device for an automatic transmission as set forth in claim 2,
wherein the adjustment force acts on said select lever to move in the same direction as an operating direction of the select operation.

5. An operating position select device for an automatic transmission as set forth in claim 2,
wherein the adjustment force acting on said select lever changes adjustment directions according to a position where the improper halt of said select lever is detected by the improper halt detecting part.

6. An operating position select device for an automatic transmission as set forth in claim 5,
wherein the improper halt preventing part has a current table with data on an adjustment current to determine the adjustment force and the adjustment direction with respect to the operating position of said select lever.

7. An operating position select device for an automatic transmission as set forth in claim 2,
wherein the improper halt detecting part detects the improper halt based on an operating velocity of said select lever to output an improper halt signal.

8. An operating position select device for an automatic transmission as set forth in claim 2,
wherein the improper halt detecting part estimates a presumed improper halt of said select lever based on the operating position and operating velocity of said select lever to output an improper signal.

9. An operating position select device for an automatic transmission as set forth in claim 2,
wherein the improper halt detecting part detects the improper halt based on the operating force to output an improper halt signal.

10. An operating position select device for an automatic transmission as set forth in claim 2,
wherein the improper halt detecting part detects the improper halt based on a select period to output an improper halt signal.

11. An operating position select device for an automatic transmission as set forth in claim 2,
wherein the improper halt preventing part forbids a provision of the adjustment force when the improper halt detecting part detects that said select lever is manually operated during an improper halt prevention control period.

12. An operating position select device for an automatic transmission as set forth in claim 2,
wherein the improper halt preventing part provides said select lever with the adjustment force in a direction opposite to an operating direction of said select lever when the improper halt detecting part detects a halt during an improper halt prevention control period.

13. An operating position select device for an automatic transmission as set forth in claim 2,
wherein the improper halt preventing part provides said select lever with the adjustment force that changes adjustment directions of the adjustment force alternatively when the improper halt detecting part detects a halt during an improper halt prevention control period.

14. An operating position select device for an automatic transmission as set forth in claim 2,
wherein the improper halt preventing part provides said select lever with the adjustment force so that the adjustment force increases in a range where reaction force acting on said select lever has a peak.

15. An operating position select device for an automatic transmission as set forth in claim 1,
wherein the adjustment force acts on said select lever to move to the one of the select positions that is nearer to a position where the improper halt of said select lever is detected by the improper halt detecting part.

16. An operating position select device for an automatic transmission as set forth in claim 1,
wherein the adjustment force acts on said select lever to move in the same direction as an operating direction of the select operation.

17. An operating position select device for an automatic transmission as set forth in claim 1,
wherein the adjustment force acting on said select lever changes adjustment directions according to a position where the improper halt of said select lever is detected by the improper halt detecting part.

18. An operating position select device for an automatic transmission as set forth in claim 17,
wherein the improper halt preventing part has a current table with data on an adjustment current to determine the adjustment force and the adjustment direction with respect to the operating position of said select lever.

19. An operating position select device for an automatic transmission as set forth in claim 1,
wherein the improper halt detecting part detects the improper halt based on an operating velocity of said select lever to output an improper halt signal.

20. An operating position select device for an automatic transmission as set forth in claim 1,
wherein the improper halt detecting part estimates a presumed improper halt of said select lever based on the operating position and operating velocity of said select lever to output an improper signal.

21. An operating position select device for an automatic transmission as set forth in claim 1,
wherein the improper halt detecting part detects the improper halt based on the operating force to output an improper halt signal.

22. An operating position select device for an automatic transmission as set forth in claim 1,
wherein the improper halt detecting part detects the improper halt based on a select period to output an improper halt signal.

23. An operating position select device for an automatic transmission as set forth in claim 1,
wherein the improper halt preventing part forbids a provision of the adjustment force when the improper halt detecting part detects that said select lever is manually operated during an improper halt prevention control period.

24. An operating position select device for an automatic transmission as set forth in claim 23, wherein the improper halt preventing part provides said select lever with the adjustment force in a direction opposite to an operating direction of said select lever when the improper halt detecting part detects a halt during an improper halt prevention control period.

25. An operating position select device for an automatic transmission as set forth in claim 23,
wherein the improper halt preventing part provides said select lever with the adjustment force that changes adjustment directions of the adjustment force alternatively when the improper halt detecting part detects a halt during an improper halt prevention control period.

26. An operating position select device for an automatic transmission as set forth in claim 23,
wherein the improper halt preventing part provides said select lever with the adjustment force so that the adjustment force increases in a range where reaction force acting on said select lever has a peak.

27. An operating position select device for an automatic transmission as set forth in claim 1,
wherein the improper halt preventing part provides said select lever with the adjustment force in a direction opposite to an operating direction of said select lever when the improper halt detecting part detects a halt during an improper halt prevention control period.

28. An operating position select device for an automatic transmission as set forth in claim 27,
wherein the improper halt preventing part provides said select lever with the adjustment force that changes adjustment directions of the adjustment force alternatively when the improper halt detecting part detects a halt during an improper halt prevention control period.

29. An operating position select device for an automatic transmission as set forth in claim 27,
wherein the improper halt preventing part provides said select lever with the adjustment force so that the adjustment force increases in a range where reaction force acting on said select lever has a peak.

30. An operating position select device for an automatic transmission as set forth in claim 1,
wherein the improper halt preventing part provides said select lever with the adjustment force that changes adjustment directions of the adjustment force alternatively when the improper halt detecting part detects a halt during an improper halt prevention control period.

31. An operating position select device for an automatic transmission as set forth in claim 30,
wherein the improper halt preventing part provides said select lever with the adjustment force so that the adjustment force increases in a range where reaction force acting on said select lever has a peak.

32. An operating position select device for an automatic transmission as set forth in claim 1,
wherein the improper halt preventing part provides said select lever with the adjustment force so that the adjustment force increases in a range where reaction force acting on said select lever has a peak.

* * * * *